US005534609A

United States Patent [19]
Lewis et al.

[11] Patent Number: 5,534,609
[45] Date of Patent: Jul. 9, 1996

[54] POLYSILOXANE COMPOSITIONS

[75] Inventors: Kenrick M. Lewis, Rego Park; Eugene C. Ward, Lake Carmel, both of N.Y.

[73] Assignee: OSi Specialties, Inc., Tarrytown, N.Y.

[21] Appl. No.: 383,092

[22] Filed: Feb. 3, 1995

[51] Int. Cl.$^6$ .................................................. C08G 77/08
[52] U.S. Cl. ............................... 528/15; 623/7; 623/8; 427/299; 427/302; 524/730
[58] Field of Search ................................ 528/15; 623/7, 623/8; 427/302, 299; 524/730

[56] References Cited

U.S. PATENT DOCUMENTS

| | | |
|---|---|---|
| 3,186,963 | 6/1965 | Lewis et al. . |
| 3,419,593 | 12/1968 | Willing . |
| 3,516,946 | 6/1970 | Modle . |
| 3,553,164 | 1/1971 | Curry . |
| 3,669,072 | 6/1972 | Reynolds et al. . |
| 3,708,467 | 1/1973 | Smith, Jr. et al. . |
| 3,775,452 | 11/1973 | Karstedt . |
| 3,814,730 | 6/1974 | Karstedt . |
| 3,989,667 | 11/1976 | Lee et al. . |
| 4,082,726 | 4/1978 | Mine et al. . |
| 4,087,585 | 5/1978 | Schulz . |
| 4,196,173 | 4/1980 | deJong et al. . |
| 4,256,870 | 3/1981 | Eckberg . |
| 4,288,345 | 9/1981 | Ashby et al. . |
| 4,311,739 | 1/1982 | Hardman et al. . |
| 4,361,310 | 11/1982 | Cummins . |
| 4,401,500 | 8/1983 | Hamada et al. . |
| 4,472,562 | 9/1984 | Shirahata . |
| 4,472,563 | 9/1984 | Chandra et al. . |
| 4,558,082 | 12/1985 | Eckberg . |
| 4,608,395 | 8/1986 | Hamada et al. ........................ 528/15 |
| 4,677,161 | 6/1987 | Suzuki et al. . |
| 4,754,013 | 6/1988 | Antonen . |
| 4,770,461 | 9/1988 | Lovaas . |
| 4,990,560 | 2/1991 | Ikeno et al. . |
| 5,023,288 | 6/1991 | Hirai et al. . |
| 5,037,312 | 8/1991 | Casciotti et al. . |
| 5,074,799 | 12/1991 | Rowlette, Sr. . |
| 5,384,382 | 1/1995 | Mori et al. ............................. 528/15 |

FOREIGN PATENT DOCUMENTS

| | | |
|---|---|---|
| 49-031286 | 3/1974 | Japan . |
| 59-220349 | 12/1984 | Japan . |
| 59-220347 | 12/1984 | Japan . |
| 59-220348 | 12/1984 | Japan . |
| 1228377 | 4/1971 | United Kingdom . |
| 1228376 | 4/1971 | United Kingdom . |

OTHER PUBLICATIONS

Corey et al., "Condensation of primary silanes in the presence of . . . Hf)", Journal of Organometallic Chemistry, 439 (1992) 1–17, pp. 1–17.
John D. Roberts, "Basic Principles of Organic Chemistry", pp. 51–55.
Walter Noll, "Chemistry and Technology of Silcones", pp. 10–12.
Marciniec, et al., "Comprehensive Handbook On Hydrosilylation", Pergamon Press, 1992, pp. 188–192.
Stokes, "Polyether Polyurethanes: Biostable Or Not?", Journal of Biomaterials Applications, vol. 3, Oct. 1988, pp. 229–259.
Belisle, et al., "Compositional Analysis of Biomer", Journal Of Biomedical Materials Research, vol. 24, 1585–1598 (1990).
Haken, et al., "Chromatographic Analysis Of Thermoplastic, Medical–Grade, Polyether–Based Polyurethane Elastomers", Journal of Chromatography, 349 (1985) 347–356.
Hitchcock, et al., "Synthesis and Structure of a rac–Tris(divinyldisiloxane) . . . Maleic Anhydride", Angew. Chem. Int. Ed. Engel 30 (1991) No. 4, pp. 438–440.
Macosko, "Rheological Changes During Crosslinking", British Polymer Journal, vol. 17, No. 2 1985, pp. 239–245.
Reikhsfel'd, et al., "Kinetics Of The Reaction with 1–Hexene And α–Methylstyrene", Leningrad Lensovet Technological Institute, vol. 36, No. 8, pp. 1478–1480, Aug. 1966.
Zhdanov, et al., "The Synthesis And Resistance To Thermal . . . Structure," Vysokomol soyed, A16: No. 8, pp. 2044–2048, 1974.
Nyaradi, et al., "Zur . . . Divinyl–disiloxane", Acta Polymerica 42 (1991) Nr. 2/3, pp. 107–109.
Benkeser et al., "The Additional Rates Of Dichloro– and . . . 1–Octene", Journal of Organometallic Chemistry, 184 (1980) pp. C3–C9.
Malkin, "Rheology in Polymerization Processes", Polymer Engineering And Science, October, 1980, vol. 20, No. 15, pp. 1035–1044.
Lee et al., "Selective Polymerization Of Reactive Cyclosiloxanes . . . Polymers", Polymer Preprints, vol. 10, No. 2, Sep. 1969, pp. 1361–1367.
Leeper, et al., "Elastomers in Medicine", Rubber Chemistry And Technology, vol. 56, (1983) pp. 523–556.
Heinz–Hermann Greve, "Rubber, 1. Survey" Ullmann's Encyclopedia Of Industrial Chemistry, Vo. A23, (1993) pp. 221–224.
Designation: D 1403–86, number of pages 8, "Standard Test Method for Cone Penetration of Lubricating Grease Using One–Quarter and One–Half Scale Cone Equipment".
Osada et al., "Intelligent Gels", 82 Scientific American May 1993, pp. 82–87.
Almdal, et al., "Towards a Phenomenological Definition of the Term 'Gel'", Polymer Gels and Networks 1 (1993), pp. 5–17.

*Primary Examiner*—Melvyn I. Marquis
*Attorney, Agent, or Firm*—Cushman Darby & Cushman

[57] ABSTRACT

A siloxane composition is described comprising a polydiorganosiloxane have at least two unsaturated hydrocarbon groups per molecule, a polyorganohydrosiloxane network crosslinker that has at least three Si—H bonds per molecule, a silane or siloxane crosslinker that has at one —SiH$_3$ group, a hydrosilation catalyst, and, optionally, a siloxane rheological control agent. The composition allows gels to be prepared that exhibit good adhesion to various substrates, and can also be used to temporarily inhibit catalyst activity. Prostheses and coatings can be produced with these compositions.

48 Claims, No Drawings

POLYSILOXANE COMPOSITIONS

BACKGROUND OF THE INVENTION

1. Field of the Invention

This invention relates to adherent polysiloxane compositions, products and articles of manufacture produced therefrom, and methods of use thereof. In particular, the invention relates to polysiloxane compositions that have the $SiH_3$ functionality therein and can be cured to yield elastomeric gels capable of adhering to a variety of surfaces.

2. Description of Related Art

Silicone rubbers, gels, and elastomers are elastic materials typically prepared by crosslinking linear polyorganosiloxanes. Heinz-Herman, "Rubber, 1. Survey," Ullman's Encyclopedia of Industrial Chemistry, Vol. A23 (1993), VCH Publishers, Inc.; Osada, et al , "Intelligent Gels," *Scientific American*, (May, 1993) pages 82–87; Almdal, et al., *Polymer Gels and Networks*, (1993), Vol. 1, pages 5–17. These materials are valued for their resistance to environmental, chemical and biochemical degradation, and for the retention of their tensile and other physical properties even after exposure to extremely high or low temperatures for long periods. Uses for silicone elastomers include encapsulants for electronic components, breast prostheses, waterproof and rust-proof coatings on metals, non-stick coatings on medical devices, dental impression gels and shock absorbing cushions in footwear and automobiles. Usually, it is essential that the polysiloxane composition have adequate cohesive strength as well as excellent adhesive strength when in contact with various substrates.

Gels, elastomers and rubbers are differentiated by the extent of crosslinking within the siloxane network and by hardness and elasticity. That is, hardness and elasticity are a function of crosslinking, as well as the specific raw materials used (e.g., shorter molecules lead to less elasticity). One quantitative measure of this difference is the modulus or resistance to deformation. Modulus is measured in units of force per unit area; for example, modulus units can be newtons per square meter, $N/m^2$, also called a Pascal, Pa. Rubbers typically have moduli of about $10^5$–$10^6$ Pa, whereas gels have moduli of about $10^2$–$10^5$ Pa. The crosslinked polysiloxane compositions of this invention are silicone gels and rubbery elastomers.

Crosslinking, also referred to as curing or vulcanization, can be effected with organic peroxides, high energy radiation or organometallic catalysts. Heat is often applied to initiate the peroxide and metal-catalyzed crosslinking reactions. The method selected depends on factors such as the composition of the polyorganosiloxane, the time and temperature required for curing and the cost of manufacturing. Crosslinking with organometallic catalysts occurs either by addition cure or condensation cure.

Typically, addition cure is catalyzed by a divalent or zerovalent platinum compound as described in U.S. Pat. Nos. 3,419,593 and 3,775,452. Addition cure is characterized by the hydrosilation reaction of an unsaturated linkage such as, for example, vinyl, alkynyl or allyl by a hydrosiloxane group, Si—H, to yield Si—C bonds. Condensation cure is usually catalyzed by tin or titanium catalysts, examples of which are disclosed in U.S. Pat. Nos. 3,186,963 and 3,708,467. In condensation cure, silanol groups combine to produce Si—O—Si linkages and water. The equations below illustrate both processes.

Addition Cure by Hydrosilation

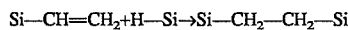

Condensation Cure

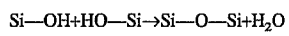

One deficiency of cured polyorganosiloxane gels and elastomers is their relatively poor adhesion to various substrates such as glass, metals and organic polymers. Several attempts have been described to correct this deficiency. For example, U.S. Pat. No. 4,401,500 teaches the use of a mixture of an alkyltrialkoxysilane and an organic hydroperoxide in an organic solvent as a primer composition to improve the adhesion of elastomeric siloxanes to organic and inorganic substrates. Japanese Patent Nos. 84/220,347, 84/220,348 and 84/220,349 describe a primer composition that contains a high viscosity methylvinylpolysiloxane fluid, a methylphenyl-siloxane resin, γ-methacryloxytrimethoxysilane, ethyl silicate, a methylhydridopolysiloxane, a platinum catalyst and a titanium catalyst in a toluene/ethyl acetate solvent.

U.S. Pat. Nos. 3,669,072, 4,082,726, 4,196,173, 4,311,739, and 4,087,585 teach that the primer step can be eliminated by direct inclusion of adhesion promoters such as vinylalkoxysilanes, vinyl epoxysilanes and epoxyalkoxysilanes in the elastomer formulation. U.S. Pat. No. 4,558,082 teaches that addition of N-vinylpyrrolidinone to a photocurable acrylated siloxane polymer improves the adhesion of the polymer to paper and polyethylene. Polysilsesquisiloxanes that have hydrido and alkoxy functionalities are described as adhesion promoters for curable polyorganosiloxanes in U.S. Pat. No. 4,677,161. Japanese Patent 74-31,286 teaches that silicone rubber compositions that contain alkoxysilanes, $HSi(OR)_3$, such as triethoxysilane have excellent adhesion to metals and plastics.

Silanes that have hydrolyzable $R$—$Si(OR)_3$ structures with a single SiH bond are well-known as adhesion promoters, as described in E. P. Plueddemann's Silane Coupling Agents (1982).

Polyorganosiloxane gels and elastomers can exhibit poor curing behavior when in contact with some surfaces, especially organic polymer films. This inhibition is probably caused by additives that make the polymer films stable to heat, light and biodegradation. The additives and/or the thermal decomposition products of these additives diffuse into the formulation and inhibit the crosslinking reactions. Simultaneously, adhesion of the elastomer to the polymer film can also be impaired.

In the formulation of curable polysiloxane gels and elastomers, additives are often included that temporarily inhibit the hydrosilation reaction (also known as hydrosilylation) to permit operations such as thorough mixing, manipulation, and mold or cavity filling while the composition is still readily flowable at room temperature. The time needed for these operations is called the work time or pot life. Upon completion of these operations, the vulcanization is then initiated by heat, light or radiation.

The reference, by B. Marciniec, *Comprehensive Handbook on Hydrosilation*, Pergamon Press, NY 1992, pg. 190, lists various temporary catalyst inhibitors. Octylsilanes having the primary silane group, $SiH_3$, are not included in that list, and are otherwise not known in the art to be temporary catalyst inhibitors.

U.S. Pat. No. 3,553,164 describes resin compositions that are derived from primary silanes and dialkenyldisiloxanes via $H_2PtCl_6$-catalyzed hydrosilylation. The resulting resins are highly crosslinked, brittle, and lack the elasticity of elastomers and gels. α, ω-Dialkenyl oligomeric and polysiloxanes are not described or used in that patent to obtain more elastic reaction products. In fact, Zhdanov et al.,

*Polymer Science*, USSR, A16(1974) 2,044–2,048, English Translation, have shown that hexachloroplatinic acid ($H_2PtCl_6$) does not catalyze the SiH to vinyl crosslinking in high molecular weight substrates, for example between α,ω-dihydrido-polydimethylsiloxanes and vinylsiloxanes at 70°–140° C.

Various references such as (1) R. A. Benkeser et al. *J. Organometallic Chemistry*, 184(1980) C3–C9, or (2) V. O. Reikhsfel'd et al., *Russian J. General Chem.* 36(1966), 1,478–1,480, or (3) ibid., 37(1967) 2,436–2,440, English Translation, teach that compounds that have the $SiH_3$ group do not undergo smooth and complete reaction of all three Si—H bonds during platinum-catalyzed hydrosilation. Moreover, these compounds often inhibit the complete stoichiometric hydrosilylation of compounds that have only $SiH_2$ or Si—H groups.

We have found that the use of $SiH_3$-containing compounds in polysiloxane compositions offers adhesion and working time benefits that were not heretofore obtainable.

SUMMARY OF THE INVENTION

Accordingly, objects of the present invention include the development of siloxane compositions that have advantages such as extended work times and excellent adhesion to various surfaces including polyurethane surfaces. These advantages are provided ideally without delay of cure at the vulcanization temperature, or loss of other advantageous features of the cured polysiloxane such as, for example, feel, elasticity, cohesive strength, and durable resilience.

These and other objectives of the instant invention have been realized by use of both an adhesion promoting crosslinker that contains the $SiH_3$ functionality and a conventional network crosslinker.

The siloxane composition comprises:

(A) a polydiorganosiloxane that contains at least two unsaturated hydrocarbon groups per molecule, (B) a polyorganohydrosiloxane that has at least three Si-H bonds per molecule, (C) a compound that has at least one —$SiH_3$ group, wherein the amount of (A) is between about 10 wt. % and 95 wt. % (preferably between about 10 wt. % and 80 wt. %, most preferably between about 15 wt. % and 35 wt. %);

and wherein the amount of (B) is between about 0.1 wt. % and about 50 wt. % (preferably between about 0.4 wt. % and about 10 wt. %);

and wherein the amount of (C) is between about 0.01 wt. % and about 5.0 wt. % (preferably between about 0.01 wt. % and about 1.0 wt. %, and most preferably between about 0.05 wt. % and about 0.5 wt. %);

and wherein the amounts of (A)–(C) are relative to each other; and (D) an effective amount of hydrosilation catalyst.

Component (A) may be represented by the formula

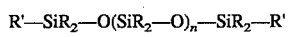

wherein R is a $C_1$–$C_{20}$ saturated group (preferably $C_1$–$C_{12}$), R' is a $C_1$–$C_{20}$ unsaturated group (preferably $C_1$–$C_{12}$) that can undergo a hydrosilation reaction, n is greater than about 100 (preferably between about 200 and about 2,000).

Component (B) may be represented by the formula

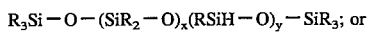

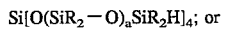

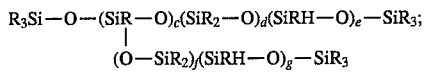

or a cyclic structure, $(RSiHO)_y$, such as

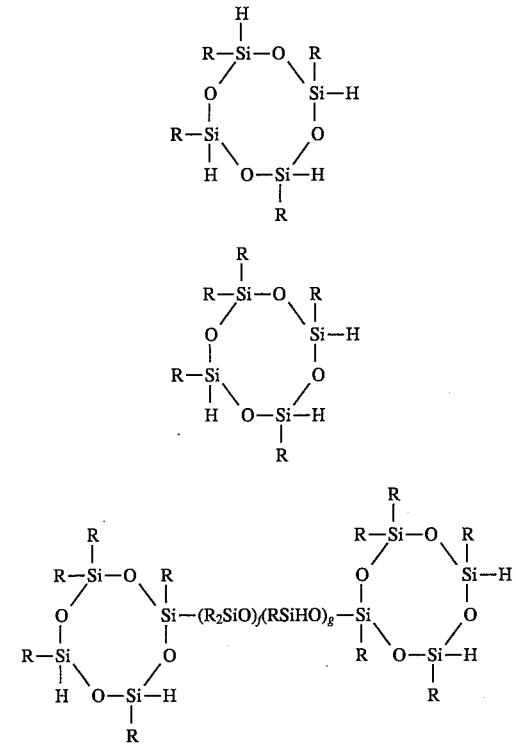

wherein R is a $C_1$–$C_{20}$ saturated group (preferably $C_1$–$C_{12}$), x is greater than 1 (preferably between about 1 and about 100), y is at least three, the sum of e and g is at least three, a, c, d, e, f, and g are any positive numbers (preferably, a is between about 0 and about 100).

Component (C) may be represented by the formula

or

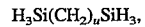

or

wherein $R^4$ is a $C_3$–$C_{20}$ hydrocarbon group, Ar is an aryl ring, k and m are at least one, u is between about one and about 20.

Component (C) may also be any siloxane compound containing the $SiH_3$ grouping. These compounds may be represented by formulae such as $H_3SiOSiH_3$, $H_3SiOSiR_3^5$, $H_3SiO(SiR_2^5O)_aSiH_3$ and $H_3SiO(SiR_2^5O)_aSiR_3^5$, wherein $R^5$ is a $C_1$–$C_{20}$ hydrocarbon group that can be linear, cyclic or branched and can be saturated or unsaturated. The subscript, a, may be any positive number (preferably, between 0 and about 100).

The $SiH_3$-bearing silane or siloxane may additionally contain heteroatoms such as boron, aluminium, tin, nitrogen, phosphorus, antimony, sulfur and selenium, provided that these heteroatom-containing silanes and siloxanes do not completely inhibit the crosslinking reaction, or in any other way diminish the benefits of the instant invention. $C_4H_9N(SiH_3)_2$ and $(CH_3)_3BN(SiH_3)_2$ are suitable examples.

Component (D) may be a platinum group metal or a compound of such a metal. Persons skilled in the art would be aware of the amount of component (D) necessary to effectively catalyze hydrosilation.

Optionally, the composition may further comprise compound (E), which is a polydiorganosiloxane compound that is represented by the formula $$R_3Si-O-(SiR_2-O)_x(RSiH-O)_y-SiR_3; \text{ or}$$

$$Si[O(SiR_2-O)_aSiR_2H]_4; \text{ or}$$

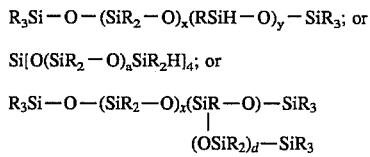

wherein R is a $C_1$–$C_{20}$ saturated group (preferably $C_1$–$C_{12}$), p is between about 50 and about 1,500 (preferably between about 100 and about 500) and a, d and x are the same as defined above with respect to B and $C_3$, and the amount of (E) is between about 30 wt. % and about 90 wt. % (preferably between about 70 wt. % and about 85 wt. %);

and wherein the amounts of (A), (B), (C) and (E) are relative to each other.

The composition may further comprise temporary catalyst inhibitors, such as acetylenic alcohols, cyclic methylvinylsiloxanes, alkynyl silanes, conjugated enynes, and maleate esters.

In addition, the composition may further comprise reinforcing inorganic fillers, non-reinforcing inorganic fillers and/or thixotropic additives, and pigments and/or dyes.

In a further embodiment, the invention relates to an external breast prosthesis that comprises the above-described polyorganosiloxane composition and a prosthesis bag, wherein the composition adheres to prosthesis bag.

The above-listed ingredients of the composition can be allowed to react to form a cured gel or elastomer that has many advantages including:

(1) excellent adhesion of the cured siloxane to polyurethane-polyester substrates without the use of surface primers, (2) excellent adhesion of the cured siloxane to polyurethane-polyester envelopes that are used in the manufacture of external breast prostheses without loss or degradation of desirable features such as feel, elasticity, modulus and cohesive strength, and (3) excellent resilience of the external breast prosthesis, especially when subjected to digital deformation.

Thus, in yet another embodiment, the invention relates to methods to promote adhesion of the above-described composition to a substrate, comprising curing the composition in contact with the substrate.

The invention also relates to methods of temporarily inhibiting catalyst activity in a hydrosilylation reaction, comprising curing the above-described composition.

In the methods of the invention, components (A), (B), and (C) of the composition may be mixed and component (D) is added thereafter. Similarly, components (A), (B), and (D) of the composition may be mixed and component (C) is added thereafter. Alternatively, components (A), (B), (C) and (D) of the composition may be combined in a two-part formulation before curing, wherein a first part of the two-part formulation comprises component (C) and a second part of the two-part formulation comprises component (D).

The present invention describes among other things the hereinabove-cited composition, the product formed by curing this composition, articles produced from this composition, and methods of use for this composition.

DETAILED DESCRIPTION OF THE PRESENT INVENTION

The component (A) can be a polydiorganosiloxane that has at least two unsaturated hydrocarbon groups per molecule. In particular, component (A) may be represented by the formula $$R'-SiR_2-O(SiR_2-O)_n-SiR_2-R'$$

wherein R is a $C_1$–$C_{20}$ saturated group (preferably $C_1$–$C_{12}$), R' is a $C_1$–$C_{20}$ unsaturated group (preferably $C_1$–$C_{12}$) that can undergo a hydrosilation reaction, n is greater than about 100 (preferably between about 200 and about 2,000). For example, R' can be methyl, ethyl, phenyl, tolyl, trifluoropropyl or heptafluoropropyl, and R' can be vinyl, allyl, vinylcyclohexyl, styryl or propargyl.

Preferably, the polydiorganosiloxane can be a linear polydimethylsiloxane that has a vinyl group attached to the silicon atom at each chain terminus. Additionally, the polydiorganosiloxane can be a copolymer, a block copolymer or mixed-substituent polymer wherein the organo groups, R, as defined hereinabove, are not all the same.

Examples of component (A) include the following:

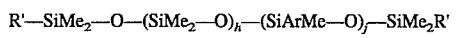

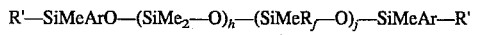

in which R' has the same meaning as defined hereinabove, Me is methyl, Ar is an aryl group such as phenyl, and $R_f$ is a fluoroalkyl group such as, for example, trifluoropropyl. The subscripts h and j can be positive numbers.

Component (A) can be olefinically terminated polydiorganosiloxanes that have a unimodal molecular weight distribution. These materials are well-known in the art and are available commercially. Representative syntheses are reported in, for example, *Polymer Preprints*, No. 10 (1969), 1,361 and *Acta Polymerica*, 42(1991) 107–109, the complete disclosures of which are incorporated herein by reference.

Alternatively, component (A) can be a blend of products such that the blend has a bimodal or higher modal molecular weight distribution. The viscosity of component (A), either as a single product or as a blend, can be between about 150 and about 500,000 centistokes and, preferably, between about 500 and about 100,000 centistokes. It is desirable that component (A) be substantially free from silanol groups, SiOH. The silanol content should be less than 150 ppm and, preferably, less than 50 ppm. Component (B) can be a linear or branched polyorganohydridosiloxane that contains at least three Si—H bonds per molecule. In particular, component (B) may be represented by the formula $$R_3Si-O-(SiR_2-O)_x(RSiH-O)_y-SiR_3; \text{ or}$$

$$Si[O(SiR_2-O)_aSiR_2H]_4; \text{ or}$$

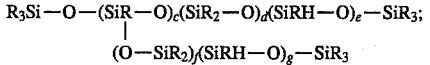

or a cyclic structure, $(RSiHO)_y$, such as

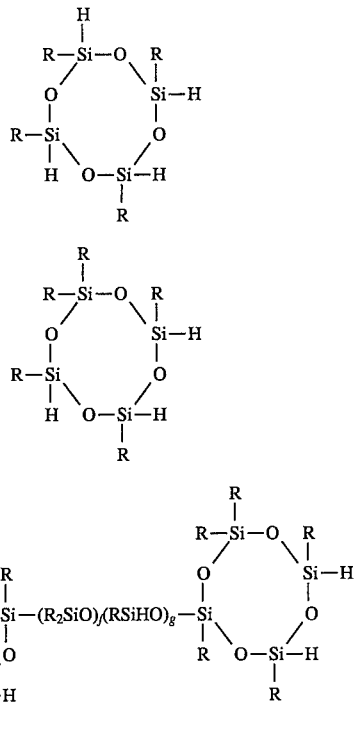

wherein R is a $C_1$–$C_{20}$ saturated group (preferably $C_1$–$C_{12}$), x is greater than 1 (preferably between about 1 and about 100), y is at least three, the sum of e and g is at least three, a, c, d, e, f, and g are any positive numbers (preferably, a is between about 0 and about 100).

The Si—H bonds can be distributed in various ways along the polymer chain, including random distribution among internal and terminal positions. The person having ordinary skill in the art can readily determine the optimum network crosslinking, adhesion and desirable feel of the silicone gel.

Other examples of component (B) products include:

$HSiR_2-O-(SiR_2-O)_x(R_rSiH-O)_y-R_2SiH$ $HSiArMe-O-(SiMe_2-O)_x(MeSiH-O)_y-ArMeSiH$ $R_3Si-O-(SiMe_2-O)_x(ArSiH-O)_y-SiR_3$

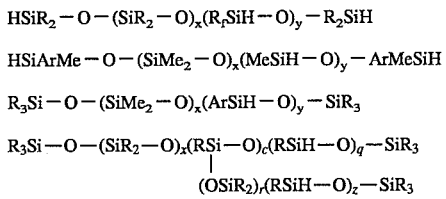

in which R, $R_r$ Me and Ar have the same meanings as defined hereinabove. Subscripts x and r can be between about 1 and about 100 and are, preferably, between about 15 and about 75. Subscript c is a positive number. In branched polyorganohydridosiloxanes, the sum of x and r is preferably between about 15 and about 75. The subscripts, q, y and z can be any positive numbers provided that the total of Si—H bonds per molecule is at least three.

Although use of a single polyorganohydridosiloxane of unimodal molecular weight distribution and well-defined functionality for crosslinking is customary, blends of polyorganohydridosiloxanes of high and low functionalities and molecular weights can sometimes offer gels with balanced cohesive gel strength, softness and adhesion, as readily determined by the person having ordinary skill in the art.

The functionality of component (B) is the number of Si—H bonds per molecule. Star-branched crosslinkers are also preferred network crosslinkers, such as, for example:

$Si[OSi(CH_3)_2H]_4$ or $Si[O(Si(CH_3)_2O)_4Si(CH_3)_2H]_4$.

Products satisfying the requirements for component (B) are well-known in the art and are available commercially. Syntheses of these products have been published in, for example, W. Noll, *Chemistry and Technology of Silicones*, Academic Press, NY 1968, the complete disclosure of which is incorporated herein by reference.

Component (C) is a compound that bears the $SiH_3$ functional group, such as primary silanes and siloxanes with a terminal —$SiH_3$ group. Examples include the primary silanes having the general formulae, $R^4(SiH_3)_k$, $H_3Si(CH_2)_uSiH_3$, and $Ar(SiH_3)_m$, wherein $R^4$ can be a $C_3$–$C_{20}$ hydrocarbon group that can be linear, cyclic or branched and can be saturated or unsaturated. Ar can be a substituted or unsubstituted aryl radical such as phenyl, tolyl, ethylphenyl or xylyl. Primary alkylsilanes that have fewer than three carbon atoms normally have boiling points <0° C. and might be too volatile to be effective under the conventional platinum-catalyzed thermal vulcanization conditions. The value of k can be at least one and, optionally, can equal an integer up to twice the number of carbon atoms in $R^4$. The value of m can be at least one and, optionally, is equal to the number of carbon atoms in the aryl radical. The value of u can be between about 1 and about 20.

Suitable primary silanes useful as adhesion promoting crosslinkers include amylsilane ($C_5H_{11}SiH_3$), hexylsilane ($C_6H_{13}SiH_3$), octylsilane ($C_8H_{17}SiH_3$) (preferred), cyclohexylsilane ($C_6H_{11}SiH_3$), phenylsilane ($C_6H_5SiH_3$), and octadecylsilane ($C_{18}H_{37}SiH_3$). Additional primary silanes include $H_3Si(CH_2)_uSiH_3$, wherein u can be between about one and about 20, and the ortho, meta and para isomers of $C_6H_4(SiH_3)_2$.

Suitable $SiH_3$-containing siloxanes useful as adhesion promoting crosslinkers include $H_3SiOSi(CH_3)_3$, $H_3SiOSi(C_5H_{11})_3$, $H_3SiOSi(C_2H_3)(CH_3)_2$, $H_3SiOSi(C_2H_3)_3$, $H_3SiO[Si(CH_3)_2O]_4SiH_3$ and $H_3SiO[Si(Ar)_2O]_3Si(C_3H_5)(C_8H_{17})_2$.

Component (C) is useful as an adhesion promoter in that it improves the adhesion between the cured polysiloxane composition and contacting surfaces, especially surfaces of polymeric substrates that contain polyurethane and/or polyester. To that end, one or more of the adhesion promoting crosslinkers (C) may be employed or, in the alternative, one or more of the adhesion promoting crosslinkers (C) in combination with other conventional adhesion promoting compounds may be used.

Component (C) is also quite useful to temporarily inhibit the catalyst activity in a hydrosilation reaction. One or more of the compounds of component (C) may be employed or, in the alternative, one or more of the compounds of component (C) in combination with other conventional adhesion promoting compounds may be used, as described below.

The hydrosilation catalyst, component (D), can be a platinum group metal or a compound of such a metal. Further, component (D) can be an addition cure hydrosilation catalyst. Examples include platinum (II) and zerovalent platinum complexes, as well as colloidal platinum. The organometallic complexes of platinum with 1,3-divinyltetramethyldisiloxane and low molecular weight vinyl endblocked organosiloxanes are preferred. These complexes are described in, for example, U.S. Pat. Nos. 3,419,593; 3,516, 946; 3,775,452; 3,814,730; 4,288,345 and in *Angewandte Chemie*, International Ed., 30(1991) 438–440. Complexes with alkynes are described in, for example, U.S. Pat. No. 4,631,310. The complete disclosures of each of these references is incorporated herein by reference.

Component (E) is a polydiorganosiloxane compound that functions as a rheology modifier. This means that component (E) influences the flow (viscosity), extension (elasticity), tension, dampening and deformation properties of the cured elastomer or gel. The magnitude of this influence depends both on the molecular weight of component (E) and on its concentration in the siloxane composition. Component (E) should be fluid, miscible with and unreactive with components (A), (B), (C) and (D).

The crosslinking reactions between the SiH bonds of components (B) and (C) and the unsaturated linkages of component (A) are accompanied by enormous changes in the rheology of the siloxane composition. Most notably, increases occur in viscosity, elasticity and modulus. The magnitude of the increases is determined by, among other variables, the crosslink density and the concentration of crosslinked polymer. Higher crosslink densities are usually associated with high modulus, high viscosity and low elasticity. Conversely, low crosslink density typically leads to the opposite of these properties. Elasticity is increased by a higher molecular weight between crosslinks. When the crosslinking reaction is conducted in the presence of component (E), the concentration of crosslinked, viscoelastic polymer in the siloxane composition is effectively reduced. Control of polymer concentration affords process control over the rheological properties of the elastomeric or gel product. For example, increases in polymer concentration bring about increases of viscosity, dampening and modulus. Increasing the molecular weight or viscosity of component (E) will also increase the probability of entanglements between the molecular chains of the crosslinked, viscoelastic polymer and those of component (E). This increased entanglement raises the overall viscosity of siloxane composition, improves its dampening ability and its capacity to return to its original condition following deformation. Rheological changes occurring during crosslinking reactions are reviewed by A. Y. Malkin, POLYMER ENGINEERING & SCIENCE, Vol. 20 (1980) 1035–1044 and C. W. Macosko, BRITISH POLYMER JOURNAL, Vol. 17 (1985) 239–245, the entire content of which references are herein incorporated by reference. The mathematical relationships among molecular properties, concentration and rheology are taught in J. D. Ferry, Viscoelastic Properties of Polymers, 3rd edition, John Wiley & Sons, NY 1980 and in R. G. Larson, Constitutive Equations for Polymer Melts and Solutions, Butterworths, Boston, 1988, the entire contents of which references are herein incorporated by reference.

Component (E) can be a linear or branched polyorganosiloxane that is essentially free of (1) unsaturated groups that can undergo hydrosilation and (2) silanol groups. Component (E) can contain cyclic diorganosiloxanes. For optimum rheological properties in the gel, it is preferable that component (E) have a viscosity less than that of component (A).

In particular, component (E) can be represented by the formula $R_3-SiO-(SiR_2-O)_p-SiR_3$; or $Si[(O-SiR_2)_aOSiR_3]_4$; or -continued $R_3Si-O-(SiR_2-O)_x(SiR-O)-SiR_3$
$\quad\quad\quad\quad\quad\quad\quad\quad\quad\quad |$
$\quad\quad\quad\quad\quad\quad\quad\quad\quad\quad (O-SiR_2)_d-SiR_3$ wherein R is a $C_1-C_{20}$ saturated group (preferably $C_1-C_{12}$), p is between about 50 and about 1,500 (preferably between about 100 and about 500) and a, d and x are the same as defined above with respect to B and C. That is, a and d are any positive numbers (preferably, a is between about 0 and about 100), and x is greater than 1 (preferably between about 1 and about 100), Examples of component (E) include $Me_3Si-O-(SiMe_2-O)_p-SiMe_3$, $Me_3Si-O-(SiMe_2-O)_p(SiArMe-O)_s-SiMe_3$, $MeAr_2Si-O-(SiR_2-O)_p(SiR-O)_v(SiR_2-O)_t-SiAr_2Me$,
$\quad\quad\quad\quad\quad\quad\quad\quad\quad\quad\quad\quad |$
$\quad\quad\quad\quad\quad\quad\quad\quad\quad\quad\quad\quad (O-SiR_2)_w-O-SiAr_2Me$ wherein p is between about 50 and about 1,500, and preferably, between about 100 and about 500; s is between about 0.1 and about 50, and preferably, between about 0.5 and about 20; t is between about 20 and about 1,500, and preferably, between about 20 and about 500; w is between about 20 about 1,500, and preferably between about 20 and about 500; and Me, Ar and R have the same meanings as defined hereinabove.

In the compositions of the invention, it is contemplated that the amount of component (A) should be between about 10 wt. % and 95 wt. % (preferably between about 10 wt. % and 80 wt. %, most preferably between about 15 wt. % and 35 wt. %). The amount of component (B) should be between about 0.1 wt. % and about 50 wt. % (preferably between about 0.4 wt. % and about 10 wt. %). The amount of component (C) should be between about 0.01 wt. % and about 5.0 wt. % (preferably between about 0.01 wt. % and about 1.0 wt. %, and most preferably between about 0.05 wt. % and about 0.5 wt. %). As would be understood by someone having ordinary skill in the art, the amounts of (A)–(C) expressed in terms of weight percents are relative to each other.

If component (E) is optionally included, the amount of component (E) is between about 30 wt. % and about 90 wt. % (preferably between about 70 wt. % and about 85 wt. %). As would be understood by someone having ordinary skill in the art, the amounts of (A), (B), (C) and (E) expressed in terms of weight percents are relative to each other.

An example of a preferred composition of the invention is a composition that comprises:

(A) a polydiorganosiloxane that contains at least two unsaturated hydrocarbon groups per molecule and that is represented by the formula $R'-SiR_2-O(SiR_2-O)_n-SiR_2-R'$ wherein R is a $C_1-C_{12}$ saturated group, R' is a $C_1-C_{12}$ unsaturated group that can undergo a hydrosilation reaction, n is between about 200 and about 2,000, and the amount of (A) is between about 10 wt. % and 80 wt. %;

(B) a polyorganohydrosiloxane that has at least three Si—H bonds per molecule and is represented by the formula $R_3Si-O-(SiR_2-O)_x(RSiH-O)_y-SiR_3$; or -continued $$Si[O(SiR_2-O)_a SiR_2 H]_4;$$ or $$R_3Si-O-(SiR-O)_c(SiR_2-O)_d(SiRH-O)_e-SiR_3;$$
$$\quad\quad\quad\quad |$$
$$\quad\quad\quad\quad (O-SiR_2)_f(SiRH-O)_g-SiR_3$$

wherein R is a $C_1$–$C_{12}$ saturated group, x is between about one and about 100, y is at least three, the sum of e and g is at least three, a is between about 0 and about 100, c,d,e,f, and g are positive numbers, and the amount of (B) is between about 0.4 wt. % and about 10 wt. %;

(C) a compound that has at least one —$SiH_3$ group, represented by the formula $$R^4(SiH_3)_k,$$

$$H_3Si(CH_2)_u SiH_3,$$

$$Ar(SiH_3)_m,$$

$$H_3SiOSiR_3{}^5,$$

$$H_3SiO(SiR_2{}^5 O)_a SiH_3$$

or $$H_3SiO(SiR_2{}^5 O)SiR_3{}^5,$$

wherein $R^4$ a $C_3$–$C_{20}$ hydrocarbon group, $R^5$ is a $C_1$–$C_{20}$ hydrocarbon group, Ar is an aryl ring, k and m are at least one, u is between about one and about 20, a is any positive number, and the amount of (C) is between about 0.01 wt. % and about 5.0 wt. %;

(D) an effective amount of hydrosilation catalyst; and (E) a polydiorganosiloxane compound that is represented by the formula $$R_3-SiO-(SiR_2-O)_p-SiR_3;$$ or $$Si[(O-SiR_2)_a OSiR_3]_4;$$ or $$R_3Si-O-(SiR_2-O)_x(SiR-O)-SiR_3$$
$$\quad\quad\quad\quad\quad\quad\quad |$$
$$\quad\quad\quad\quad\quad\quad\quad (O-SiR_2)_d-SiR_3$$

wherein R is a $C_1$–$C_{12}$ saturated group, p is between about 50 and about 1,500 and a, d and x are the same as defined above with respect to B and C. That is, a and d are any positive numbers (preferably, a is between about 0 and about 100), and x is greater than 1 (preferably between about 1 and about 100), and the amount of (E) is between about 30 wt. % and about 90 wt. %;

wherein the amounts of (A), (B), (C) and (E) are relative to each other.

Various temporary catalyst inhibitors, component (F), can be optionally included with component (D) in order to increase the storage stability and working time of the polyorganosiloxane composition prior to curing. Acetylenic alcohols such as 2-methyl-3-butyn-2-ol are described for such purpose in U.S. Pat. No. 3,445,420; cyclic methylvinylsiloxanes in U.S. Pat. No. 3,989,667; alkynyl silanes in U.S. Pat. No. 4,472,562; conjugated enynes in U.S. Pat. No. 4,472,563; and maleate esters in U.S. Pat. No. 4,256,870. A complete listing is published in B Marciniec, Comprehensive Handbook on Hydrosilylation, Pergamon Press, NY 1992, p. 190. The complete disclosure of each of these references is incorporated herein by reference.

In the present invention, the $SiH_3$-containing adhesion promoting crosslinker (C) can also act as a temporary catalyst inhibitor.

Mixtures of adhesion promoters and work time extenders can be employed advantageously for improved performance and processing of the curable polysiloxane composition, as known to the person having ordinary skill in the art. For example, methylvinylcyclosiloxanes, dialkylmaleates or alkynols can be combined with the $SiH_3$-containing compounds of this invention.

One of ordinary skill would be aware how best to optimize mixtures to obtain particularly desired results. For instance, it may be desirable to combine diethylmaleate with the primary silane to obtain extended pot-life, enhanced adhesion to substrate and shortened cure time at temperatures>80° C. Longer cure times, extended pot-life and enhanced adhesion can be obtained with combinations of primary silanes and methylvinylcyclosiloxanes. These conditions may be desirable if the formulation must flow into and fill cavities at moderate temperatures prior to crosslinking.

Optionally, reinforcing and non-reinforcing inorganic fillers and thixotropic additives, component (G), can also be included in the composition. Component (G) comprises, for example, reinforcing and non-reinforcing inorganic fillers and thixotropic additives such as fumed silica, precipitated silica, finely powdered quartz, calcium carbonate, talc, alumina, silicon nitride, aluminum nitride and titanium dioxide. Hydrophobized fumed silica is especially preferred because it prevents crepe hardening in the stored polyorganosiloxane composition prior to its curing. Blends of hydrophobized and hydrophilic silica also provide a safeguard against excessive solids settling in the stored material prior to curing. Some elastomers, especially elastomers that must be electrically conductive, are filled with finely powdered metal such as copper, silver, gold, or platinum particles. Such products are described in U.S. Pat. Nos. 4,770,641; 5,037,312; and 5,074,799, the complete disclosures of which are incorporated herein by reference.

Specific thixotropes that can be employed in conjunction with fumed silica and other fillers include the commercial products sold under the trade names, KEVLAR ULTPATHIX™, TROYTHIX™ XYZ and THIXCIN™. KEVLAR ULTPATHIX filler is a fibrous form of poly(p-phenyleneterephthalamide) manufactured and sold by DUPONT as a thixotrope. TROYTHIX XYZ and THIXCIN fillers are both triglycerides derived from glycerol and castor oil fatty acids. TROYTHIX is a trademark of TROY CORPORATION and THIXCIN is a trademark of BAKER CASTOR OIL CO.

Component (G) can also comprise pigments and dyes used to color the gels and elastomers.

In many applications, the polyorganosiloxane compositions are cured in situ in an enclosure. For example, curing can be effected in an envelope made of a polyurethane-polyester copolymer, or of a polyurethane-polyether copolymer, or of polydimethylsiloxane-polydiphenylsiloxane copolymer. Descriptions of envelope materials have been published in *Rubber Chemistry and Technology*, 56(1983) 523–556; *J. Biomaterials Applications*, 3(1988) 228–259; *J. Chromatography*, 349(1985) 347–356 and *J. Biomedical Materials Research*, 24(1990) 1,585–1,598. The complete disclosures of these references are incorporated herein by reference.

In practice, the polymers used as barrier materials are often fabricated as thin films and laminates in contact with disposable backings made of paper, polyethylene or polypropylene. The films can be cast from solvents or from the melt. Release agents are used to facilitate separation of the film from the backing. Additionally, the film can contain antioxidants and other specialty ingredients to protect the film from oxidation, heat, light and biodegradation.

These ingredients and/or their thermal decomposition products can inhibit the curing of the polyorganosiloxane composition. Along with the above-mentioned release agents, these ingredients can also inhibit adhesive bonding of the cured polyorganosiloxane to the envelope material. However, the adhesion promoting crosslinker (C) permits excellent adhesive bonding of the cured elastomer to envelope and substrate materials, irrespective of the method of film fabrication, release agents and/or special protective additives.

The self-adherent polyorganosiloxane gel and elastomer compositions of the instant invention are made by mixing the components (A)–(G) described hereinabove in proportions hereinafter defined, placing the resultant mixture in an appropriate container or on an appropriate surface, and curing the mixture with heat at a temperature from about 25° C. up to about 200° C., and preferably, between about 70° C. and about 150° C., for a period up to about 4 hours. As is well known, longer times are associated with conditions such as lower temperatures, lower catalyst levels, inhibited catalysts, and lower crosslinker concentrations.

If all the ingredients are mixed together in a one part formulation, the order of mixing is important to prevent premature curing of the composition. Thus, the catalyst, even when inhibited, is typically the last ingredient added to a one part formulation. Alternatively, the ingredients can be combined selectively in a two part formulation. Mixing of the two parts occurs just prior to curing. The two parts are mixed in a gravimetric ratio that corresponds to the Si—H/vinyl stoichiometry yielding the desired cure kinetics and gel or elastomer properties. The essential criterion used in formulating the separate parts is the segregation of the hydrosilylation catalyst and the Si—H crosslinker. The person having ordinary skill in the art can determine appropriate mixing methods without undue experimentation.

The amount of components (A)–(G) depends on the intended use of the gel or elastomer and can be readily determined by the person having ordinary skill in the art. For example, if the gel is to be used in an external breast prosthesis, then the following composition can be used. The amount of component (A) should be at least about 10 weight percent and maximally about 95 weight percent of the total formulation. The preferred amount is between about 15 and about 35 weight percent.

The amount of component (B) is selected Such that the stoichiometric ratio of Si—H groups to unsaturated groups in component (A) is between about 0.3 and about 10 and, preferably, between about 0.8 and about 2. Thereby, the gravimetric content of component (B) in the formulation typically can be between about 0.1 and about 50 weight percent, preferably between about 0.4 and about 10 weight percent.

The quantity of component (C) can be between about 0.1 and about 5.0 Weight percent, preferably between about 0.01 and about 1.0 weight percent, and most preferably, is between about 0.05 and about 0.5 weight percent.

The catalytic amount of component (D) depends on the desired work time and curing rate. A broad range between about 0.1 and about 100 ppm Pt based on the total weight of the formulation is normally effective. The preferred range is between about 2.5 and about 15 ppm Pt. The person having ordinary skill in the art can determine optimal catalyst use.

Component (E) can be between about 30 and about 90 weight percent and is, preferably, between about 70 and about 85 weight percent.

The effective level of component (F) is also determined by the desired work time and processing conditions. Moreover, as will be shown by examples below, the temporary catalyst inhibitors have different intrinsic inhibitive tendencies. For example, considerably less diethyl maleate or methylvinylcyclosiloxane is required on a stoichiometric basis relative to platinum than octylsilane to achieve the same degree inhibition. Effective levels of fillers and thixotropes (component G) can account for between about 0.01 and about 5 weight percent of the total formulation. Amounts between about 1.0 and about 2.5 weight percent are preferred. Pigments such as, for example, flesh-toned lighter and darker shades, can be optionally included in the formulation in appropriate amounts determined readily by the person having ordinary skill in the art.

Components A and D typically constitute the bulk of the mass of a gel formulation. The contents of the other ingredients can be expressed relative to the combined weights of these two components.

The proportions of the ingredients can also be expressed as stoichiometric ratios. Thus, the ratio of hydrosilane, Si—H, equivalents from both the network (B) and adhesion promoting (C) crosslinkers to unsaturated equivalents such as vinyl equivalents can be, for example, between about 0.5 and about 7.5, and preferably, between about 0.8 and about 6. The ratio of Si—H equivalents from the network crosslinker (B) to those from adhesion promoting crosslinker (C) can be, for example, between about 0.1 and about 3, and preferably between about 0.2 and about 2.

As a formulation parameter to control the processing and properties of curable polysiloxane compositions, it is well known to use the variation of the stoichiometric ratio between equivalents of Si—H in the network crosslinker B and equivalents of the unsaturated group such as a vinyl group in component A. Gel firmness follows an approximately parabolic profile with increasing Si—H/vinyl ratio, whereas work time and gel time decrease logarithmically.

Tackiness and adhesion of the cured composition are generally decreased with increasing Si—H/vinyl ratio. However, Si—H/vinyl ratios higher than those used with conventional network crosslinkers can be employed in the formulation described herein without loss of desirable processing and properties. In fact, work time is desirable extended, tack and adhesion are improved and firmness remains controllable at the higher Si—H/vinyl ratios.

The $SiH_3$-containing adhesion promoting crosslinker is preferably included in the siloxane composition during curing so that the cured elastomer or gel is self-adherent to its substrate. The compositions of the invention are also useful as primers. For instance, the $SiH_3$-containing compound may also be used in a separate step as a primer to improve the bonding between the surface of the elastomer or gel and a substrate.

A primer, as defined in J. Shields, ADHESIVES HANDBOOK, Butterworths, London, Second Edition (1976) p 341, is a surface coating applied beforehand to improve bonding of the surface to an adhesive or any overlayer. U.S. Pat. No. 4,401,500 and Japanese Patents 84/220,347, 84/220,348, 84/220,349 disclose primer compositions for improving the adhesion of siloxane compositions to metals, glass and plastics. However, none of these compositions comprises the use of an $SiH_3$-containing compound.

When used as a primer, the $SiH_3$-containing compound may be applied to surfaces with a brush, or as a spray or by any of the methods known in the art for this treatment. The $SiH_3$-containing compound may be used neat, or dissolved in a readily vaporized solvent which will not deteriorate the properties of the surfaces and their adhesion to the elastomer or gel. Heptane, hexane, toluene, xylene, ethyl acetate, butyl propionate, ethanol isopropanol, amyl alcohol, 2-ethylhexanol, trichloroethylene, chloroform, methylene chloride, trichlorofluoromethane and supercritical carbon dioxide and their miscible combinations are all suitable solvents for the $SiH_3$-containing primers, but the list is not limited to these alone. The quantity of solvent is not narrowly critical. One skilled in the art can determine the concentration of $SiH_3$-containing compound which affords the optimum viscosity for the method of application and minimum solvent evaporation time.

Priming permits the use of those $SiH_3$-containing compounds which are too volatile for inclusion in the self-adherent formulations. $CH_3SiH_3$, $C_4H_9SiH_3$, $Si_2H_6$ and $H_3SiOSiH_3$ are examples of such compounds. Substrates can be treated with solutions of these primers, or exposed directly to atmospheres containing these volatile compounds. Priming can be performed in-line during a continuous manufacturing process, or as a separate earlier unit operation. In both cases, sufficient time must be allowed for evaporation of the solvent at the processing temperature.

The following illustrative and comparative examples describe the instant invention in more detail. However, they are not intended to limit the scope of the specification and the claims.

EXAMPLES

Materials

Terminal vinylsiloxane fluids were used in the experiments as component (A). One fluid had a viscosity of about 2,000–2,500 centistokes and a vinyl content of about 0.24±0.02 weight percent; the other a viscosity of about 60,000–70,000 centistokes and a vinyl content of about 0.07±0.01 weight percent. These fluids are referred to in the examples as vinyl fluid (2,000 cstk) and vinyl fluid (60,000 cstk), respectively. A trimethylsiloxy terminated dimethylsiloxane oil of viscosity 350 centistokes was the plasticizer/rheology modifier of component (E). The network crosslinkers (B), $MD_{15}D'_{5.5}M$, $MD_{20}D'_{3.2}M$, and $MD_{43.2}D'_{6.8}M$, ($M=(CH_3)_3SiO_{1/2}$; $D=(CH_3)_2SiO$; $D'=CH_3SiHO$) were used in the experiments. Octylsilane, $C_8H_{17}SiH_3$, phenylsilane, $C_6H_5SiH_3$, and octadecylsilane, $C_{18}H_{37}SiH_3$, were the adhesion promoting crosslinkers (C).

Polyurethane-polyester films and external breast prosthesis bags used in the tests are commercial materials sold, for example by Atochem and Smith & Nephew, Ltd. These films are often supplied with a polyethylene or paper backing that was removed just prior to the experiments described hereinbelow. The backing is typically used to control static electricity and facilitate handling. The film surface that was contacted with the curing polysiloxane formulation was the surface not covered by the polyethylene or paper backing.

A platinum catalyst (D) referred to as PCAT I was prepared according to the method described by Karstedt in U.S. Pat. No. 3,775,452, the complete disclosure of which is incorporated herein by reference. The complex of 1,3-divinyltetramethyldisiloxane so prepared was dissolved in silicone oil, 500 cstk, to obtain a stock solution containing about 2.5–3 wt % Pt. Another platinum catalyst referred to as PCAT II was made from methylvinylsiloxane cyclic tetramer and cyclic trimer and hexachloroplatinic acid dissolved in isopropanol, as described in British Patent Nos. 1,228,376 and 1,228,377, the complete disclosures of which are incorporated herein by reference. Pt content of this catalyst was 3.2 wt %. A 1 cc syringe was used to dispense the small quantities of catalyst required for some experiments.

Gel Testing

Gel firmness Was measured with a penetrometer fitted with a ¼ size, 2.5 gram grease cone, 7.0 gram shaft according to ASTM D1403-86, "Standard Test Method for Cone Penetration of Lubricating Grease Using One-Quarter and One-Half Scale Cone Equipment." Measurements are shown in 1/10 millimeter, a unit Standard in the art. Lower values indicate firmer gels. Values between about 70 and about 100 correspond to a life-like feel in the gel and are most desirable for external mammary prostheses. However, values outside of this range are acceptable for gels that are required to be harder or softer for other purposes.

Cure time and gel time were measured in the following ways. In the first way, gel firmness was measured as a function of time following the addition of catalyst to a one part formulation, or of time following mixing of both parts of a two part formulation. The time required to attain a stable reading is the cure time. In the second way, a Bholin Stress Rheometer was used to measure and record the loss (that is, viscosity, $G''$), and storage (that is, elasticity, $G'$), moduli, dynamic modulus, $G^*$, and phase angle, $\delta$, between the stress and strain of the curing gel/elastomer. The time for gelation is approximately the time at which the loss and storage moduli intersect. References related to these rheological measurements include S. K. Venkataram et al. *Polymer Preprints*, 29(1988) pgs. 571–572; C. W. Mackosko, et al. *Macromolecules*, 9(1976) 199; and E. E. Holly, et al., *J. Non-Newtonian Fluid Mechanics*, 27(1988) 17–26. The cure time is the point at which the dynamic modulus attains a constant or near constant value. The ratio of the loss modulus to the storage modulus, $G''/G'$, is equal the tangent of the phase angle, or tan $\delta$. Tan $\delta$ measures the damping ability of the cured or curing polysiloxane composition. Tan $\delta$ values less than about 0.1, and preferably, between about 0.01 and about 0.08, are desirable for the gels contained in external breast prostheses.

Pull strength was measured with the Instron Model 1123 using samples cut from a cured gel sandwich. A gel sandwich was prepared between two sheets of polyurethane-polyester film in a stainless steel mold that had internal dimensions 11.3 cm×7.5 cm×3 mm. The sandwich was sealed in the mold and cured at 125° C. for 45 minutes. The length of the polyurethane-polyester film extended beyond the gel boundary in the mold to facilitate attachment of the sample to the Instron during pull strength measurement. For this, the cooled, cured sandwich was cut longitudinally into three equal slices of dimensions 11.3 cm×2.5 cm×3 mm. Thus, triplicate measurements were performed for each sandwich made. The sample was supported on a small lab jack elevated to the height of the bottom clamp on the Instron. The excess polyurethane-polyester film was appropriately attached at the top to the tensile load cell, and at the bottom, to the stationary clamp of the Instron. A pulling force was applied to the top film such that the load cell moved upwards at 5 in/min. The force was recorded in grams. Values greater than or equal to 100 grams are desirable. Additionally, it is desired that the adhesive strength of the gel to the polyurethane-polyester film be greater than its cohesive strength.

A qualitative, manual pull strength test was also done. In this test, a gel sample was cured in contact with a strip of polyurethane-polyester film. After the sample was removed from the oven, the strip was pulled away from the cured gel to determine the locus of adhesion failure. If the film peeled away cleanly from the gel surface with no adherent gel, then failure occurred at the gel-film interface, and adhesive failure occurred. Adhesive failure is undesirable. If the gel broke and tore during the pull test and gel remained firmly adherent to the film, cohesive failure occurred. Cohesive failure is desirable because it is indicative of strong bonding at the gel-film interface.

Example 1

This example illustrates that compounds (C) that have the primary silane functionality, $SiH_3$, obtain good adhesion of the cured gel to polyurethane-polyester films. The films used were U01 and U073 from Atochem and a sample supplied by Smith & Nephew Ltd.

A mixture with the following composition was made from the indicated raw materials

| RAW MATERIAL | PARTS BY WEIGHT |
|---|---|
| Vinylsiloxane Fluid (2,000 cstk) | 14.67 |
| Vinylsiloxane Fluid (60,000 cstk) | 7.33 |
| Silicone Oil (350 cstk) | 78.00 |

Forty gram samples of this mixture were used in each experiment. The quantities of network crosslinker, ($MD_{43.2}D'_{6.8}M$), adhesion promoting crosslinker (octylsilane, phenylsilane or octadecylsilane) are shown in Table 1. Percentages are reported relative to the combined weights of silicone oil and vinylsiloxane fluids (40 gm). 0.01 gm PCAT I (equivalent to 6.3 ppm Pt) was used in the experiments with octylsilane. Twice that amount was used with phenylsilane and octadecylsilane.

In each experiment, the ingredients were combined in a 300 ml waxed paper-cup that was capable of withstanding temperatures up to 175° C. and stirred mechanically at about 1,500 rpm for about 45 seconds. The sample was then deaerated under vacuum for 5 minutes. A sharp razor blade was used to trim the paper cup down to the level of its contents, and sections about 8 cm wide by 10 cm long of polyurethane-polyester film were placed gently on the surface of the liquid. Samples were then cured in an oven at 125° C. for 45 minutes. A duplicate sample without overlaying film was cured for the measurement of gel penetration. U073 film, 75 micron thick, was used in all the experiments shown in Table 1. Excellent adhesion of gel to film was also observed in tests done with 50 micron thick polyurethane-polyester film from Smith & Nephew. The results of the qualitative pull tests illustrate the necessity for $SiH_3$ functionalized compounds to obtain desirable adhesion of cured gel to the film. The data also show that desirable adhesion and gel firmness are realized over broad ranges of concentration for network crosslinker, $MD_{43.2}D'_{6.8}M$, and adhesion promoting crosslinkers, $n-C_8H_{17}SiH_3$, $C_6H_5SiH_3$, and $C_{18}H_{37}SiH_3$. The stoichiometric ratio of Si—H equivalents from the network crosslinker to those from the $SiH_3$-containing compound spanned 0.2–1.4, whereas the stoichiometric ratio of Si—H equivalents to vinyl equivalents spanned 0.8–5.5.

TABLE 1

EFFECT OF $n-C_8H_{17}SiH_3$, $C_6H_5SiH_3$ AND $C_{18}H_{37}SiH_3$ ON FILM-GEL ADHESION

| $MD_{43.2}D'_{6.8}M$ | | $n-C_8H_{17}SiH_3$ | | RESULTS | |
|---|---|---|---|---|---|
| gm | wt % | gm | wt % | PENET. | ADHES. |
| 0.279 | 0.698 | — | — | nm | adh. |
| 0.279 | 0.698 | 0.04 | 0.100 | nm | coh. |
| 0.290 | 0.725 | — | — | 109 | adh. |
| 0.290 | 0.725 | 0.047 | 0.118 | 91 | coh. |
| 0.200 | 0.500 | 0.06 | 0.150 | 86 | coh. |
| 0.328 | 0.82 | 0.06 | 0.150 | 65 | coh. |
| 0.681 | 1.703 | 0.09 | 0.225 | 83 | coh. |
| 0.690 | 1.725 | 0.084 | 0.210 | 80 | coh. |
| 0.726 | 1.815 | 0.091 | 0.228 | 82 | coh. |

| $MD_{43.2}D'_{6.8}M$ | | $n-C_6H_5SiH_3$ | | RESULTS | |
|---|---|---|---|---|---|
| gm | wt % | gm | wt % | PENET. | ADHES. |
| 0.280 | 0.700 | 0.014 | 0.035 | 59 | coh. |
| 0.280 | 0.700 | 0.021 | 0.053 | 57 | coh. |
| 0.280 | 0.700 | 0.036 | 0.090 | 56 | coh. |

| $MD_{43.2}D'_{6.8}M$ | | $n-C_{18}H_{37}SiH_3$ | | RESULTS | |
|---|---|---|---|---|---|
| gm | wt % | gm | wt % | PENET. | ADHES. |
| 0.280 | 0.700 | 0.079 | 0.198 | 63 | coh. |

PENET. = PENETRATION, 1/10 Mm, ASTM D-1403-86
ADHES. = ADHESION
adh. = adhesive failure at gel/film interface in manual pull test
coh. = cohesive gel breakage in manual pull test
nm = not measured Example 2

This example illustrates the use of two additional network crosslinkers with octylsilane to make self-adherent polysiloxane compositions useful as gels in external breast prostheses. Both U073 and the Smith & Nephew, S&N, polyurethane-polyester films were tested for gel-film adhesion. A 4 cm wide by 8 cm long section of each film was applied to the surface of each sample prior to cure. Otherwise, the sample preparation and test procedure were those described in Example 1. Forty grams of the blend of vinylsiloxane fluids and silicone oil and a platinum concentration of 6.3 ppm were used in each experiment. Table 2 sets forth the quantities of network crosslinkers and octylsilane, as well as experimental results.

The results show that the levels of network and adhesion promoting crosslinkers afforded gels that have excellent gel-film bonding.

TABLE 2

IMPROVED GEL-FILM ADHESION WITH OCTYLSILANE AND $MD_{15}D'_{5.5}M$ OR $MD_{20}D'_{3.2}M$

| CROSSLINKER $MD_{15}D'_{5.5}M$ | | $n-C_8H_{17}SiH_3$ | | ADHESION | | |
|---|---|---|---|---|---|---|
| gm | wt % | gm | wt % | S&N | U073 | PENET. |
| 0.155 | 0.388 | — | — | adh. | adh. | 82 |
| 0.155 | 0.388 | 0.040 | 0.100 | coh. | coh. | 72 |

| CROSSLINKER $MD_{15}D'_{3.2}M$ | | $n-C_8H_{17}SiH_3$ | | ADHESION | | |
|---|---|---|---|---|---|---|
| gm | wt % | gm | wt % | S&N | U073 | PENET. |

TABLE 2-continued

IMPROVED GEL-FILM ADHESION WITH OCTYLSILANE
AND $MD_{15}D'_{5.5}M$ OR $MD_{20}D'_{3.2}M$

| | | | | | | |
|---|---|---|---|---|---|---|
| 0.285 | 0.713 | — | — | adh. | adh. | 100 |
| 0.285 | 0.713 | 0.042 | 0.105 | coh. | coh. | 91 |
| 0.285 | 0.713 | 0.144 | 0.360 | coh. | coh. | 84 |

Penet. units are in 1/10 mm.

Example 3

This example illustrates the preparation of external breast prostheses using a curable polysiloxane composition comprising the network crosslinker ($MD_{43.2}D'_{6.8}M$), and an adhesion promoting crosslinker (n—$C_8H_{17}SiH_3$).

The two part formulation had the following composition. All values are in grams.

| COMPONENT | PART A | PART B |
|---|---|---|
| Vinylsiloxane Fluid, 2,000 cstk | 34.33 | 34.33 |
| Vinylsiloxane Fluid, 60,000 cstk | 17.17 | 17.17 |
| Silicone Oil (350 cstk) | 198.5 | 198.5 |
| $MD_{43.2}D'_{6.8}M$ | 3.588 | — |
| n-$C_8H_{17}SiH_3$ | 0.458 | — |
| PCAT I | — | 0.014 |
| Flesh-tone pigment | 0.096 | — |

Each part was blended separately with a Cowles Dissolver at 1,500 rpm for 15 minutes. 220 gm of each part was blended together with a mechanical stirrer at 1,500 rpm for 5 minutes and deaerated under vacuum for 10 minutes. With the aid of a 100 ml syringe, an external prosthesis bag fabricated from U073 film was filled with 136 gm of the pink, flesh toned deaerated liquid. Another bag fabricated with U073 film on the back side and Smith & Nephew film on the front was similarly filled with 252 gm of the pink, flesh toned deaerated liquid. Both bags were heat sealed and later clamped into metal molds that correspond to various breast sizes and shapes. Cure occurred in an oven at 125° C. for 90 minutes. The unused reaction mixture was set aside at room temperature for estimation of the working time of the formulation.

The cured prostheses had a life-like feel, resilience and responsiveness. Gel to film adhesion was checked on the front and back of each prosthesis by slitting the devices with a razor blade to isolate a section about 2 cm wide by 4 cm long for manual pull testing. Cohesive gel breakage was observed in each case. Moreover, the gel was not readily scraped away from the film of the test section. These observations confirm that n-octylsilane imparts excellent adhesion to the gel formulation not only in small test samples as in Example 1, but also in external breast prostheses.

The unused reaction mixture was still fluid and able to be poured after 16 hours at room temperature. Thus the working time of the formulation was in excess of 16 hours.

Example 4

This comparative control illustrates the effect of omitting the adhesion promoting crosliner from the breast prosthesis formulation.

The two part formulations employed were similar to that shown in Example 3, except that the n—$C_8H_{17}SiH_3$ was omitted from PART A. In one experiment, the weight of the network crosslinker, $MD_{43.2}D'_{6.8}M$, in PART A was kept unchanged at 3.588 grams, while in another the weight was increased to 8.886 grams to make the stoichiometric ratio of SiH groups to vinyl groups equal to that of Example 3. The composition of PART B was unaltered.

Prostheses were prepared at room temperature and cured at 125° C. as described in Example 3. Crosslinking, indicated by an observable increase in the viscosity of the blended formulation and the difficulty of filling the bags manually by syringe, was occurring at ambient temperature even as the prosthesis bags were being filled. The pot-life was <30 minutes for both experiments.

The cured prostheses showed no gel to film adhesion. The prosthesis made with the lower level of network crosslinker was soft and limp. The prosthesis made with the higher level was hard and rubbery. Both lacked the life-like feel, resilience and responsiveness described in Example 3 for the prosthesis containing n—$C_8H_{17}SiH_3$. Although it is possible to obtain this feel by control of the SiH/Vinyl stoichiometry, desirable gel to film adhesion will still not be realized without the incorporation of adhesion promoter. :

Example 5

This example illustrates the increase in gel time which results from the use of n-octylsilane.

Forty grams of the blend of vinylsiloxanes and silicone oil defined in Example 1 were used together with 0,288 grams of the network crosslinker ($MD_{43.2}D'_{6.8}M$), and the quantities of the other formulation components indicated in Table 3. The platinum concentration was 6.3 ppm. Samples were prepared as described in Example 1, except that film strips were not overlaid. A small amount of each reaction mixture was applied to the cone and plate stage of the Bholin Stress Rheometer, which was controlled at 25° C.

The data show that gel time is increased nearly 60-fold by the addition of 0.1 wt. % n—$C_8H_{17}SiH_3$ to the formulation. Thus, n—$C_8H_{17}SiH_3$ is a potent temporary catalyst inhibitor.

TABLE 3

EFFECT OF OCTYLSILANE ON GEL TIME

| SAMPLE | CURE TEMP, °C. | GEL TIME,sec |
|---|---|---|
| No Additive | 25 | 1,521.2 (25.35 min.) |
| 0.1 wt % n-$C_8H_{17}SiH_3$ | 25 | 91,020.1 (1,517 min.) |

Example 6

This example illustrates further the temporary inhibitive effect of octylsilane on the crosslinking of siloxane compositions.

Samples were formulated with the blend of vinylsiloxane and siloxane oil described in Example 1 and quantities of network crosslinker ($MD_{43.2}D'_{6.8}M$) and adhesion promoter (n—$C_8H_{17}SiH_3$), to give the SiH/Vinyl stoichiometries shown in Table 4. In the calculation of SiH/Vinyl stoichiometry, each mole of n—$C_8H_{17}SiH_3$ contributes 3 SiH equivalents and each mole of network crosslinker contributes 6.8 SiH equivalents. Platinum concentration was held constant at 4–4.6 ppm in all of the experiments of this example. PCAT I was the catalyst used.

Cure of the gels occurred on the stage of the Bholin Stress Rheometer using a heating rate of 2.5° C./min from 25° C. up to 150° C. Dynamic modulus, (G*), followed a sigmoidal profile with increasing temperature. The rapid increase of G* began at an initiation temperature corresponding to the onset of cure in the gel sample. This initiation temperature is determined by the specific nature and amount of the temporary catalyst inhibitor. Higher initiation temperatures are associated with a greater extent of temporary inhibition. Lower initiation temperatures reflect increasing ease of siloxane cure.

Gelation was initiated at 42° C., 40° C. 37° C. and 34° C. as SiH/Vinyl stoichiometry was increased from 0.834 to 2.12 in the four comparative examples of Table 4. These samples contained the network crosslinker ($MD_{43.2}D'_{6.8}M$) and no n—$C_8H_{17}SiH_3$. The data show that gel cure is facilitated by an increase in SiH/Vinyl stoichiometry when the network crosslinker is the only source of the SiH groups. The logarithm of the initiation temperature correlates linearly and negatively with SiH/Vinyl stoichiometry.

Table 4 shows that in the presence of n—$C_8H_{17}SiH_3$, initiation temperature increased as SiH/Vinyl stoichiometry was increased. In fact, the logarithm of the initiation temperature correlates linearly and positively with the SiH/Vinyl stoichiometry. This means that addition of n—$C_8H_{17}SiH_3$ to the siloxane formulation caused a delay in its curing. However, the samples containing n—$C_8H_{17}SiH_3$ exhibited excellent gel-film adhesion with U073 film and acceptable gel firmness, penetration and dynamic moduli.

TABLE 4

EFFECT OF n-$C_8H_{17}SiH_3$ ON THE INITIATION TEMPERATURE FOR GEL CURE

| SAMPLE DESCRIPTION | SIH/VINYL | INIT. TEMP., °C. |
|---|---|---|
| COMPARATIVE EXAMPLES | | |
| 0.70 wt % $MD_{43.2}D'_{6.8}M$ | 0.834 | 42 |
| 0.85 wt % $MD_{43.2}D'_{6.8}M$ | 1.112 | 40 |
| 1.17 wt % $MD_{43.2}D'_{6.8}M$ | 1.526 | 37 |
| 1.62 wt % $MD_{43.2}D'_{6.8}M$ | 2.120 | 34 |
| EXAMPLES CONTAINING 0.70 wt % $MD_{43.2}D'_{6.8}M$ AND | | |
| 0.02 wt % n-$C_8H_{17}SiH_3$ | 1.112 | 53 |
| 0.05 wt % n-$C_8H_{17}SiH_3$ | 1.526 | 62 |
| 0.10 wt % n-$C_8H_{17}SiH_3$ | 2.120 | 88 |

Example 7

This Example illustrates the comparative effects of temporary catalyst inhibitors on an addition cure formulation suitable for silicone coatings on thermoplastic materials, for example, polyurethane-polyester or styrene-olefin-butadiene block copolymers. The overall siloxane composition of the formulation is shown in Table 5. The inhibitors used and their concentrations are summarized in Table 6. PCAT I was the catalyst used.

For each experiment summarized in Table 6, the molar quantities of inhibitor and platinum were added with manual mixing into 80 gm aliquots of the siloxane composition. Samples were cured isothermally on the stage of the Bholin Stress Rheometer maintained at 25° C. Gel time was measured at the intersection of the storage and loss moduli as explained hereinabove and illustrated in Example 4. Longer gel times indicate a higher extent of catalyst inhibition.

TABLE 5

SILOXANE COMPOSITION OF EXPERIMENTAL COATINGS FORMULATION

| INGREDIENT | CONTENT, wt % |
|---|---|
| Vinyl Fluid (2000 cstk) | 92.82 |
| Crosslinker, $MD_{43.2}D'_{6.8}M$ | 7.18 |

TABLE 6

COMPARISON OF TEMPORARY CATALYST INHIBITIORS

| INHIBITOR AND CONCN., $10^4$ mole | Pt, $10^6$ mole | GEL TIME, sec |
|---|---|---|
| COMPARATIVE EXAMPLES NO INHIBITOR | 1.71 | 97 |
| DIETHYL MALEATE | | |
| 0.232 | 3.90 | 174 |
| 1.626 | 5.75 | 245 |
| 3.543 | 2.63 | 320 |
| METHVINYLCYCS*, | | |
| 0.145 | 3.41 | 162 |
| 0.261 | 2.92 | 222 |
| ILLUSTRATIVE EXAMPLES n-$C_8H_{17}SiH_3$ | | |
| 2.217 | 2.63 | 121 |
| 4.365 | 2.63 | 151 |
| 6.721 | 2.63 | 211 |
| 2.217 | 1.85 | 118 |
| 4.43 | 1.75 | 200 |

*Tetramethyltetravinylcyclotetrasiloxane

It is clear from Table 6 that all three temporary catalyst inhibitors lengthen the gel times. The extent of the inhibition depends both on the inhibitor and platinum concentrations. Although n-octylsilane is less potent than the other two inhibitors shown, it offers good processing latitude and the additional advantage of excellent adhesion of the coating to the thermoplastic substrate.

Example 8

This example illustrates the use of $SiH_3$-containing additives as primers for polyurethane-polyester films.

The two-part formulation described in Example 3 was used without n-octylsilane in PART A. Equal weights of Parts A and B were combined, stirred mechanically and then deaerated in vacuo for 10 minutes. The films were U01 from Atochem and a sample from Smith & Nephew (S&N). Gel sandwiches were prepared with primed and unprimed control films and cured at 125° C. for 45 minutes as described above (vide supra Gel Testing). The primers were applied as neat liquids by brushing or spraying. Primed films were left undisturbed at ambient temperature for 15–60 min (drying time) before the gel sandwiches were made. The results of qualitative manual pull tests are summarized in Table 7.

The results show that good bonding occurred at the gel-film interface whenever n-octylsilane or phenylsilane was used as a primer. The locus of failure during the manual pull tests was within the gel (cohesive failure) and not at the gel-film interface. Unprimed films showed unacceptable gel-film bonding and failed adhesively.

TABLE 7

USE OF SiH₃-CONTAINING ADDITIVES AS SURFACE PRIMERS

| PRIMER | FILM SAMPLE | DRYING TIME min | ADHESION RESULTS |
|---|---|---|---|
| n-C₈H₁₇SiH₃ | U01 both surfaces | 60 | cohesive failure |
|  |  | 30 | cohesive failure |
|  |  | 15 | cohesive failure |
| NONE | U01 both surfaces |  | adhesive failure |
| n-C₈H₁₇SiH₃ | U01 Top Surface only primed. | 30 | cohesive failure on top adhesive failure on lower surface. |
| n-C₈H₁₇SiH₃ | S&N both surfaces | 15 | cohesive failure |
| C₆H₅SiH₃ | U01 both surfaces | 60 | cohesive failure |

While the invention has been described in detail and with reference to specific embodiments thereof, it will be apparent to those of ordinary skill in the art that various changes and modifications can be made therein without departing from the spirit and scope thereof.

The entire contents of all references mentioned above are incorporated herein by reference.

What we claim is:

1. A composition that comprises:

(A) a polydiorganosiloxane that contains at least two unsaturated hydrocarbon groups per molecule, (B) a polyorganohydrosiloxane that has at least three Si—H bonds per molecule, (C) a compound that has at least one —SiH₃ group, wherein the amount of (A) is between about 10 wt. % and 95 wt. %, the amount of (B) is between about 0.1 wt. % and about 50 wt. %, the amount of (C) is between about 0.01 wt. % and about 5.0 wt. %, the amounts of (A)–(C) being relative to each other; and (D) an effective amount of hydrosilation catalyst.

2. The composition of claim 1, which further comprises compound (E), which is a linear or branched polydiorganosiloxane compound which is essentially free of silanol groups and unsaturated groups that can undergo hydrosilation, wherein the amount of (E) is between about 30 wt. % and about 90 wt. %; and wherein said amounts of (A), (B), (C) and (E) are relative to each other.

3. The composition according to claim 1, wherein component (A) is represented by the formula

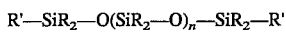

R'—SiR₂—O(SiR₂—O)ₙ—SiR₂—R' wherein R is a C₁–C₂₀ saturated group, R' is a C₁–C₂₀ unsaturated group that can undergo a hydrosilation reaction and n is greater than about 100.

4. The composition according to claim 3, wherein R is a C₁–C₁₂ saturated group.

5. The composition according to claim 3, wherein R is selected from the group consisting of methyl, ethyl, phenyl, tolyl, trifluoropropyl and heptafluoropropyl.

6. The composition according to claim 3, wherein R' is selected from the group consisting of vinyl, allyl, vinylcyclohexyl, styryl and propargyl.

7. The composition according to claim 3, wherein n is between about 200 and about 2,000.

8. The composition according to claim 1, wherein component (A) is substantially free of silanol groups.

9. The composition according to claim 1, wherein the amount of component (A) is between about 15 wt. % and about 35 wt. %.

10. The composition according to claim 1 wherein component (B) is represented by the formula

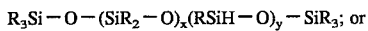

R₃Si—O—(SiR₂—O)ₓ(RSiH—O)ᵧ—SiR₃; or

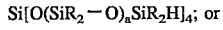

Si[O(SiR₂—O)ₐSiR₂H]₄; or

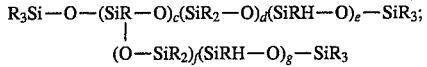

R₃Si—O—(SiR—O)_c(SiR₂—O)_d(SiRH—O)_e—SiR₃;
                    |
              (O—SiR₂)_f(SiRH—O)_g—SiR₃ or cyclic structure, (RSiHO)ᵧ,

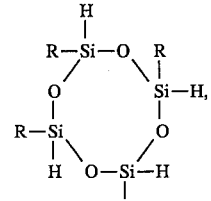

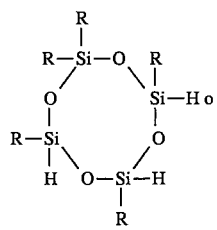

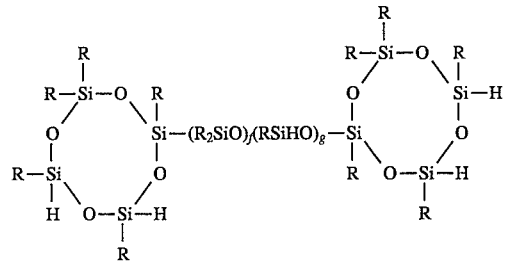

wherein R is a C₁–C₂₀ saturated group, x is greater than 1, y is at least three, the sum of e and g is at least three, a, c, d, and f are greater than or equal to zero, and e and g are any positive numbers.

11. The composition according to claim 10, wherein R is a C₁–C₁₂ saturated group.

12. The composition according to claim 10, wherein x is between about 1 and about 100.

13. The composition according to claim 10, wherein a is between about 0 and about 100.

14. The composition of claim 1, wherein the amount of component (B) is between about 0.4 wt. % and 10 wt. %.

15. The composition of claim 1, wherein component (C) is represented by the formula

R⁴(SiH₃)ₖ,

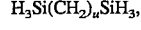

H₃Si(CH₂)ₐSiH₃,

Ar(SiH₃)ₘ,

H₃SiOSiR⁵₃,

H₃SiO(SIR⁵₂O)ₐSiH₃ or $H_3SiO(SiR^5{}_2O)_aSiR^5{}_3$, wherein $R^4$ a $C_3$–$C_{20}$ hydrocarbon group, $R^5$ is a $C_1$–$C_{20}$ hydrocarbon group, Ar is an aryl ring, k and m are at least one, u is between about one and about 20, and a is greater than or equal to zero.

16. The composition according to claim 1, wherein component (C) is a primary silane.

17. The composition according to claim 1, wherein component (C) is selected from the group consisting of amylsilane, hexylsilane, octylsilane, cyclohexylsilane, phenylsilane and octadecylsilane.

18. The composition according to claim 1, wherein component (C) is selected from the group consisting of $H_3Si(CH_2)_uSiH_3$, in which u is between about 1 and about 20, and the ortho, meta and para isomers of $C_6H_4(SiH_3)_2$.

19. The composition according to claim 15, wherein component (C) is selected from the group consisting of $H_3SiOSi(CH_3)_3$, $H_3SiOSi(C_5H_{11})_3$, $H_3SiOSi(C_2H_3)(CH_3)_2$, $H_3SiOSi(C_2H_3)_3$, $H_3SiO[Si(CH_3)_2O]_4SiH_3$ and $H_3SiO[Si(Ar)_2O]_3Si(C_3H_5)(C_8H_{17})_2$.

20. The composition according to claim 15, wherein a is a number between 0 and about 100.

21. The composition according to claim 1, wherein the amount of component (C) is between about 0.01 wt. % and about 1.0 wt. %.

22. The composition according to claim 1, wherein the amount of component (C) is between about 0.05 wt. % and about 0.5 wt. %.

23. The composition according to claim 1, wherein component (D) is a platinum group metal or a compound of such a metal.

24. The composition according to claim 1, wherein component (D) is an addition cure hydrosilation catalyst.

25. The composition according to claim 2, wherein component (E) is represented by the formula $R_3—SiO—(SiR_2—O)_p—SiR_3$; or $Si[(O—SiR_2)_aOSiR_3]_4$; or $R_3Si—O—(SiR_2—O)_x(SiR—O)—SiR_3$
                          |
                          $(O—SiR_2)_d—SiR_3$ wherein R is a $C_1$–$C_{20}$ saturated group, a and d are greater than or equal to zero, p is between about 50 and about 1,500 and x is greater than 1.

26. The composition according to claim 25, wherein p is between 100 to about 500.

27. The composition according to claim 2, wherein the viscosity of component (E) is less than the viscosity of component (A).

28. The composition according to claim 2, wherein component (E) is substantially free of unsaturated groups that can undergo hydrosilation, and silanol groups.

29. The composition according to claim 2, wherein component (E) is selected from the group consisting of $Me_3Si—O—(SiMe_2—O)_p—SiMe_3$, and $Me_3Si—O—(SiMe_2—O)_p(SiArMe—O)_s—SiMe_3$, $[MeAr_2Si—O—(SiR_2—O)_p(SiR—O)_v(SiR_2—O)_t—SiAr_2Me,]$
                                    |
                                    $(O—SiR_2)_w—O—SiAr_2Me$ wherein p is between about 50 and about 1,500; s is between about 0.1 and 50;

t is between about 20 and about 1,500;

w is between about 20 about 1,500;

Me is methyl; and

Ar is an aryl group.

30. The composition according to claim 2, wherein the amount of component (E) is between about 70 wt. % and about 85 wt. %.

31. The composition according to claim 1, which further comprises temporary catalyst inhibitors.

32. The composition according to claim 31, wherein said temporary catalyst inhibitors are selected from the group consisting of acetylenic alcohols, cyclic methylvinylsiloxanes, alkynyl silanes, conjugated enynes, and maleate esters.

33. The composition according to claim 1, which further comprises reinforcing inorganic fillers, non-reinforcing inorganic fillers and/or thixotropic additives.

34. The composition according to claim 1, which further comprises pigments and/or dyes.

35. A composition that comprises:

(A) a polydiorganosiloxane that contains at least two unsaturated hydrocarbon groups per molecule and that is represented by the formula $R'—SiR_2—O(SiR_2—O)_n—SiR_2—R'$ wherein R is a $C_1$–$C_{12}$ saturated group, R' is a $C_1$–$C_{12}$ unsaturated group that can undergo a hydrosilation reaction, n is between about 200 and about 2,000, and the amount of (A) is between about 10 wt. % and 80 wt. %;

(B) a polyorganohydrosiloxane that has at least three Si—H bonds per molecule and is represented by the formula $R_3Si—O—(SiR_2—O)_x(RSiH—O)_y—SiR_3$; or $Si[O(SiR_2—O)_aSiR_2H]_4$; or $R_3Si—O—(SiR—O)_c(SiR_2—O)_d(SiRH—O)_e—SiR_3$;
                              |
                              $(O—SiR_2)_f(SiRH—O)_g—SiR_3$ wherein R is a $C_1$–$C_{12}$ saturated group, x is between about one and about 100, y is at least three, the sum of e and g is at least three, a is between about 0 and about 100, c,d,e,f, and g are positive numbers, and the amount of (B) is between about 0.4 wt. % and about 10 wt. %;

(C) a compound that has at least one —$SiH_3$ group, represented by the formula $R^4(SiH_3)_k$, or $H_3Si(CH_2)_uSiH_3$, or $Ar(SiH_3)_m$, $H_3SiOSiR^5{}_3$, $H_3SiO(SiR^5{}_2O)_aSiH_3$ or $H_3SiO(SiR^5{}_2O)_aSiR^5{}_3$, wherein $R^4$ a $C_3$–$C_{20}$ hydrocarbon group, $R^5$ is a $C_1$–$C_{20}$ hydrocarbon group, Ar is an aryl ring, k and m are at least one, u is between about one and about 20, and a may be any positive number, and the amount of (C) is between about 0.01 wt. % and about 1.0 wt. %;

(D) an effective amount of hydrosilation catalyst; and (E) a polydiorganosiloxane compound that is represented by the formula $$R_3-SiO-(SiR_2-O)_p-SiR_3;\text{ or}$$

$$Si[(O-SiR_2)_aOSiR_3]_4;\text{ or}$$

$$R_3Si-O-(SiR_2-O)_x(SiR-O)-SiR_3$$
$$|$$
$$(O-SiR_2)_d-SiR_3$$

wherein R is a $C_1$–$C_{12}$ saturated group, a and d are greater than or equal to zero, p is between about 50 and about 1,500, x is greater than 1, and the amount of (E) is between about 30 wt. % and about 90 wt. %;

wherein said amounts of (A), (B), (C) and (E) are relative to each other.

36. An external breast prosthesis that comprises a polyorganosiloxane composition according to claim 1 and a prosthesis bag.

37. The prosthesis according to claim 36, wherein said bag comprises a polyurethane-polyester film.

38. A product prepared by curing the composition according to claim 1.

39. A method to promote adhesion of a siloxane composition to a substrate, comprising curing the siloxane composition in contact with the substrate, wherein the siloxane composition comprises (A) a polydiorganosiloxane that contains at least two unsaturated hydrocarbon groups per molecule, (B) a polyorganohydrosiloxane that has at least three Si—H bonds per molecule, (C) a compound that has at least one —$SiH_3$ group, wherein the amount of (A) is between about 10 wt. % and 95 wt. %, the amount of (B) is between about 0.1 wt. % and about 50 wt. %, and the amount of (C) is between about 0.01 wt. % and about 5.0 wt. %, the amounts of (A)–(C) being relative to each other; and (D) an effective amount of hydrosilation catalyst.

40. The method of claim 39, wherein the siloxane composition further comprises compound (E), which is a linear or branched polydiorganosiloxane compound which is essentially free of silanol groups and unsaturated groups that can undergo hydrosilation, wherein the amount of (E) is between about 30 wt. % and about 90 wt. %;

and wherein said amounts of (A), (B), (C) and (E) are relative to each other.

41. The method of claim 39, wherein components (A), (B), and (C) are mixed and component (D) is added thereafter.

42. The method of claim 39, wherein components (A), (B), (C) and (D) are combined in a two-part formulation before curing, wherein a first part of the two-part formulation comprises component (C) and either component (A) or component (B), and a second part of the two-part formulation comprises component (D) and component (A) if the first part includes component (B), or component (B) if the first part includes component (A).

43. A method of temporarily inhibiting catalyst activity in a hydrosilylation reaction, comprising curing a siloxane composition comprising (A) a polydiorganosiloxane that contains at least two unsaturated hydrocarbon groups per molecule, (B) a polyorganohydrosiloxane that has at least three Si—H bonds per molecule, (C) a compound capable of temporarily inhibiting catalyst activity that has at least one —$SiH_3$ group, wherein the amount of (A) is between about 10 wt. % and 95 wt. %, the amount of (B) is between about 0.1 wt. % and about 50 wt. %, and the amount of (C) is between about 0.01 wt. % and about 5.0 wt. %, the amounts of (A)–(D) being relative to each other; and (D) an effective amount of hydrosilation catalyst.

44. The method of claim 43, wherein the siloxane composition further comprises compound (E), which is a linear or branched polydiorganosiloxane compound which is essentially free of silanol groups and unsaturated groups that can undergo hydrosilation, wherein the amount of (E) is between about 30 wt. % and about 90 wt. %;

and wherein said amounts of (A), (B), (C) and (E) are relative to each other.

45. The method of claim 43, wherein components (A), (B), and (D) are mixed and component (C) is added thereafter.

46. The method of claim 43 wherein components (A), (B), (C) and (D) are combined in a two-part formulation before curing, wherein a first part of the two-part formulation comprises component (C) and either component (A) or component (B), and a second part of the two-part formulation comprises component (D) and component (A) if the first part includes component (B), or component (B) if the first part includes component (A).

47. A method to promote adhesion of a siloxane composition to a substrate, comprising the steps of priming the substrate with a first composition comprising a compound that has at least one —$SiH_3$ group, contacting the substrate primed with the first composition with a siloxane composition comprising (A) a polydiorganosiloxane that contains at least two unsaturated hydrocarbon groups per molecule, (B) a polyorganohydrosiloxane that has at least three Si—H bonds per molecule, and an effective amount of hydrosilation catalyst, wherein the amount of (A) is between about 10 wt. % and 95 wt. %, the amount of (B) is between about 0.1 wt. % and about 50 wt. %, and the amount of the compound that has at least one —$SiH_3$ group is between about 0.01 wt. % and about 5.0 wt. %, the amounts of (A), (B) and said compound being relative to each other, and curing the siloxane composition in contact with the substrate.

48. The method of claim 47, wherein the siloxane composition further comprises compound (E), which is a linear or branched polydiorganosiloxane compound which is essentially free of silanol groups and unsaturated groups that can undergo hydrosilation, wherein the amount of (E) is between about 30 wt. % and about 90 wt. %;

and wherein said amounts of the first composition, (A), (B) and (E) are relative to each other.

* * * * *